MULTIPLE IMAGE PROJECTION SYSTEM

Filed Sept. 20, 1967 10 Sheets-Sheet 1

INVENTOR:
MORLEY MARKSON
GEORGE A. ROLSTON
PATENT AGENT:

MULTIPLE IMAGE PROJECTION SYSTEM

Filed Sept. 20, 1967 10 Sheets-Sheet 2

INVENTOR:
MORLEY MARKSON
GEORGE A. ROLSTON
PATENT AGENT:

March 24, 1970 M. MARKSON 3,502,402

MULTIPLE IMAGE PROJECTION SYSTEM

Filed Sept. 20, 1967 10 Sheets-Sheet 3

INVENTOR:
MORLEY MARKSON
GEORGE A. ROLSTON
PATENT AGENT:

INVENTOR:
*MORLEY MARKSON*
*GEORGE A. ROLSTON*
PATENT AGENT:

INVENTOR:
MORLEY MARKSON
GEORGE A. ROLSTON
PATENT AGENT:

March 24, 1970 M. MARKSON 3,502,402

MULTIPLE IMAGE PROJECTION SYSTEM

Filed Sept. 20, 1967 10 Sheets-Sheet 6

INVENTOR:
MORLEY MARKSON
GEORGE A. ROLSTON
PATENT AGENT:

INVENTOR:
MORLEY MARKSON
GEORGE A. ROLSTON
PATENT AGENT:

MULTIPLE IMAGE PROJECTION SYSTEM

Filed Sept. 20, 1967 10 Sheets-Sheet 8

INVENTOR:
MORLEY MARKSON
GEORGE A. ROLSTON
PATENT AGENT:

INVENTOR:
MORLEY MARKSON
GEORGE A. ROLSTON
PATENT AGENT:

INVENTOR:
MORLEY MARKSON
GEORGE A. ROLSTON
PATENT AGENT:

United States Patent Office 3,502,402
Patented Mar. 24, 1970

3,502,402

MULTIPLE IMAGE PROJECTION SYSTEM

Morley Markson, 167 Madison Ave., Toronto 5, Ontario, Canada

Filed Sept. 20, 1967, Ser. No. 668,998
Int. Cl. G03b *37/00*
U.S. Cl. 352—69 9 Claims

ABSTRACT OF THE DISCLOSURE

A projection system having a screen in a viewing chamber on which an image is projected from a projector to fill the screen and mirrors abutting on at least two of the edges of the screen arranged at selective angles around the screen extending towards a viewer from the screen. The image on the screen is repeated on the mirrors with a high order of definition, giving a resultant pattern of apparent or virtual images thereon and an appearance of an ultra-wide screen projection to the viewer.

This invention relates to a structure such as an auditorium or viewing chamber for use in association with means projecting an image such as a motion picture, slide, or other types of projection.

One of the problems of a large-screen theatre and projection system is the fact that the larger the screen, and thus the image, the more light is required in the projection system to provide a given illuminance level on the screen. In addition to the high cost of a high intensity light projection system, the heat on the film is intense and the film requires constant replacement.

Another problem of a large-screen theatre projection system is that of the wide-angle lens which must be used at a relatively short throw to produce a large image. Such lenses, for extremely wide-angle projection are expensive, and the images are not uniformly sharp, often falling off considerably in definition at the edges. Furthermore, no lenses have as yet been developed, to achieve the ultra-wide screen projections, which can now be achieved, according to the present invention.

One attempt to overcome these aspects of the problem in the past has been to use multiple projectors, projecting multiple images, and sometimes involving multiple screens. However these systems, which have found application usually in exhibitions and the like make it mandatory to employ a specially synchronised film requiring synchronised projectors and sound. As a result such systems are prohibitively expensive and do not represent commercially workable methods.

A further problem is that of definition. Where a single image is greatly magnified for large-screen projection the definition is poor and the image tends to be "grainy." Furthermore, any slight vibration in the projector is enormously magnified. To accomodate these effects the viewer is normally required to stand further back, thus losing the impact of the large screen which occupies proportionately less of his total field of vision.

By the use of the present invention a small image is projected and multiplied many times and thus avoids need for high intensity light sources and ultra-wide-angle projection systems, and achieves a high order of definition permitting viewers to stand close to the screen, avoiding problems of vibration.

It is the object of the invention to provide a viewing chamber in which an image on a viewing screen is repeated by reflection in an apparently infinite series of repetitions.

More particularly it is an object of the invention to provide such a chamber in which the repeated images appear to curve either toward or away from the viewer, or lie in a flat plane.

More particularly it is an object of the invention to provide such a chamber in which the repeated image corner points appear to lie on the surface of a sphere extending either in a concave or convex manner relative to the viewer.

Various preferred embodiments of the invention will now be described with reference to the following drawings in which like references refer to like parts throughout the various views and diagrams and in which;

FIGURE 1 is a schematic perspective illustration of a viewing chamber according to one embodiment;

FIGURE 2 is a schematic plan view of the embodiment of FIGURE 1, showing the virtual image pattern, FIGURE 3 is a schematic elevational view of the embodiment of FIGURE 1, showing the virtual image pattern, FIGURE 4 is a schematic illustration of the virtual image pattern of a further embodiment of viewing chamber based on FIGURE 1, FIGURE 5 is a schematic perspective illustration of a viewing chamber according to a further embodiment, FIGURE 6 is a schematic plan view of the embodiment of FIGURE 5, showing the virtual image pattern, FIGURE 7 is a schematic elevational view of the embodiment of FIGURE 5, showing the virtual image pattern, FIGURE 8 is a schematic illustration of the virtual image pattern of a further embodiment of viewing chamber based on FIGURE 5, FIGURE 9 is a schematic perspective illustration of a further embodiment, FIGURE 10 is a schematic perspective illustration of a further embodiment, FIGURE 11 is a perspective partially cut away view of a typical structural wall or ceiling member of a viewing chamber according to the invention, FIGURE 12 is a schematic diagram showing the formation of double and triple images in a mirror, FIGURE 13 is a graph showing the reflectance characteristics of the various surfaces in a typical mirror, plotted against incident light angles;

Figure 16:
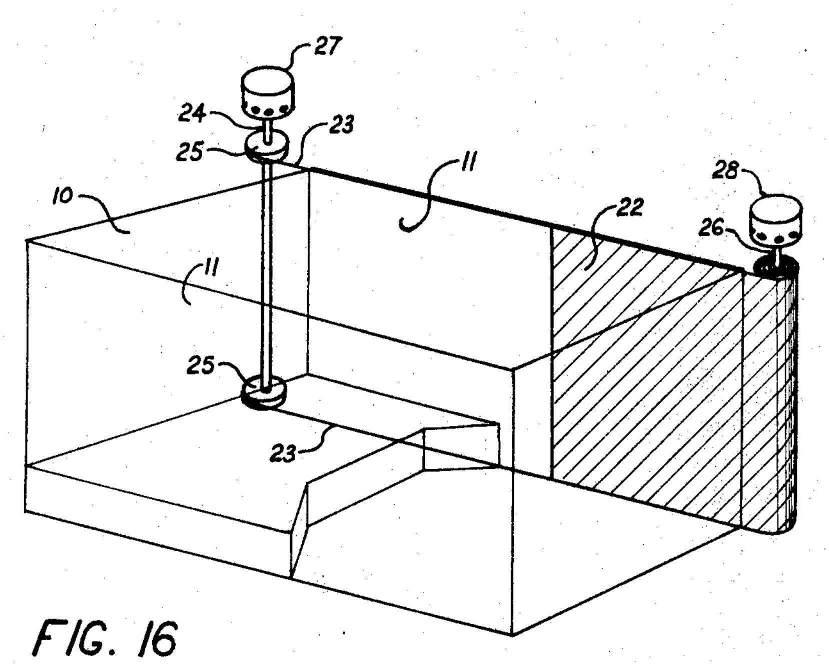
Figure 17:
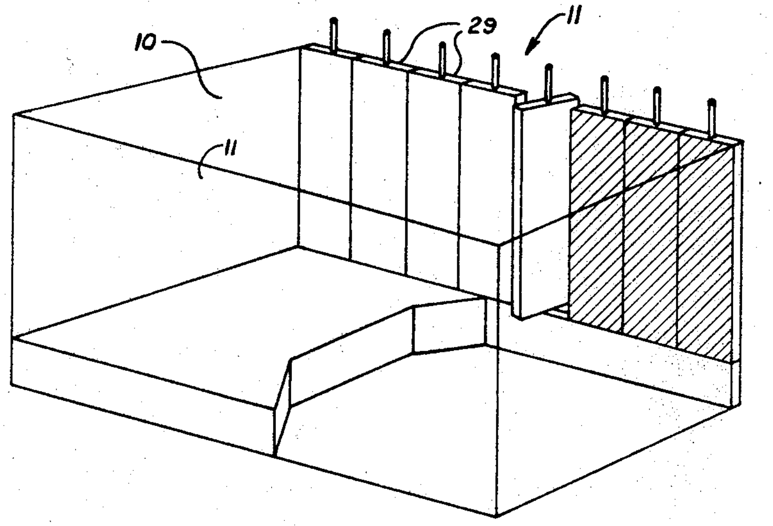
Figure 15A:
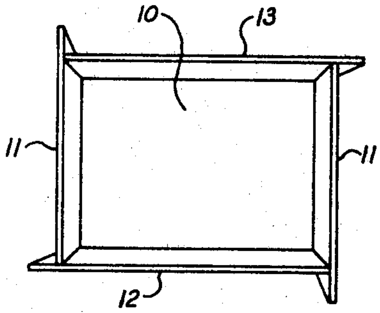
FIGURE 15 is a schematic end view of a viewing chamber having movable ceiling and floor mirror surfaces.
Figure 19:
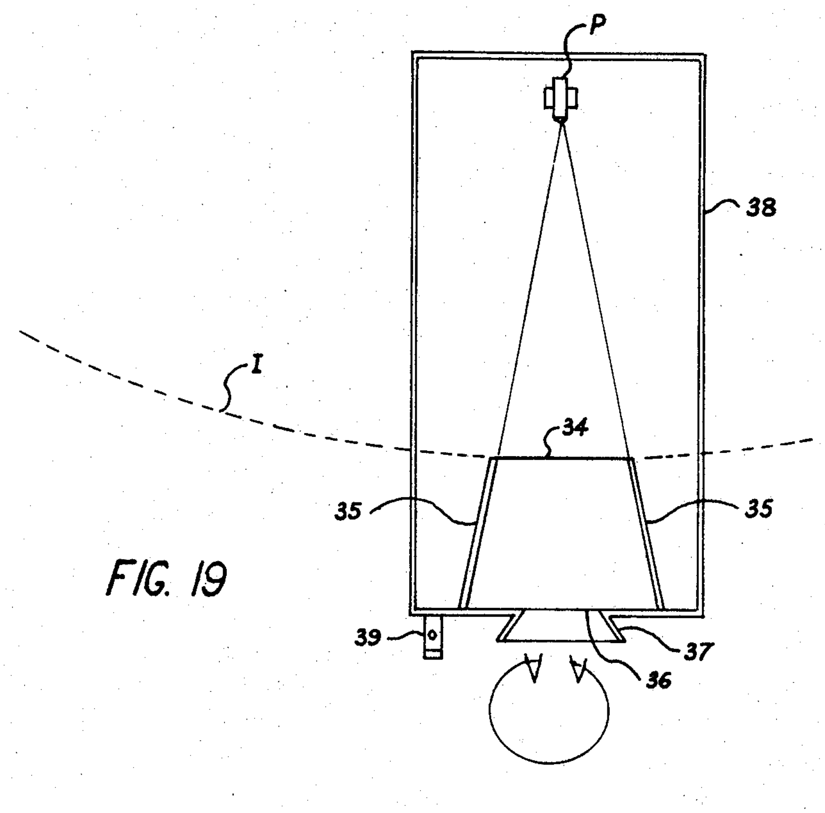
Figure 18:
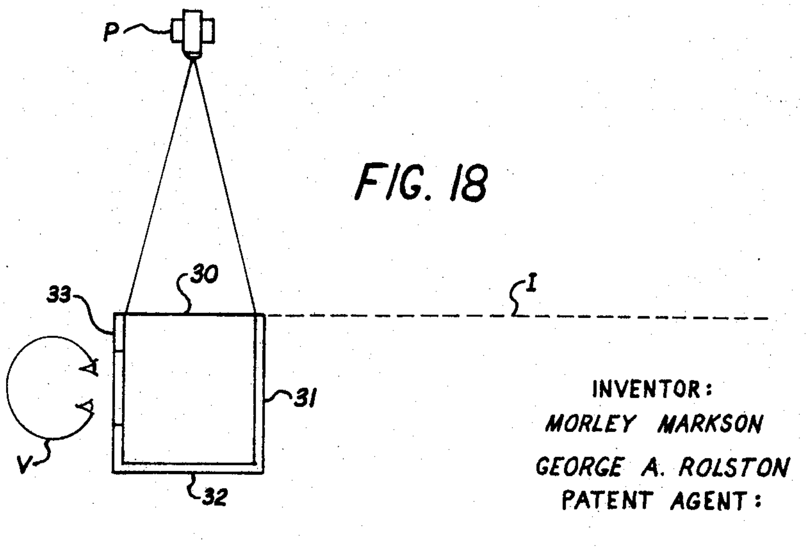

FIGURE 15*a* is a schematic end view of a viewing chamber having moveable ceiling floor and wall portions;

FIGURE 16 is a perspective schematic illustration showing a further embodiment of viewing chamber having one or more mirror surfaces which may be covered or uncovered;

FIGURE 17 is a perspective schematic illustration showing another embodiment of viewing chamber, similar to that of FIGURE 16, in which one or more of the mirror surfaces may appear or disappear, FIGURE 18 is a schematic top plan view of a further embodiment of viewing chamber, and, FIGURE 19 is a schematic top plan view of a further embodiment of viewing chamber suitable for use, for example, in a coin-operated installation.

In general the invention comprises a viewing screen arranged at one end of a viewing chamber and two or more mirrors adjacent to the screen arranged in parallel, converging or diverging manner, and a projector arranged so as to project an image on the screen of such shape and dimensions as to fill the screen to the edges thereof whereby to create a repeating image without discontinuities at the margins.

Figure 1:
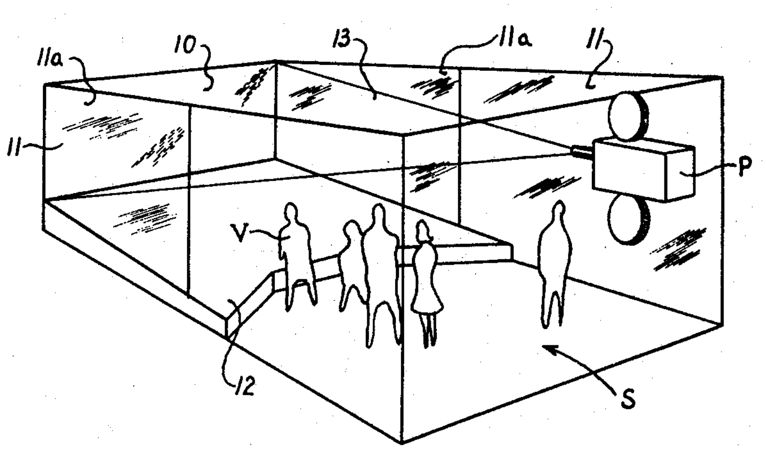
Figure 2:
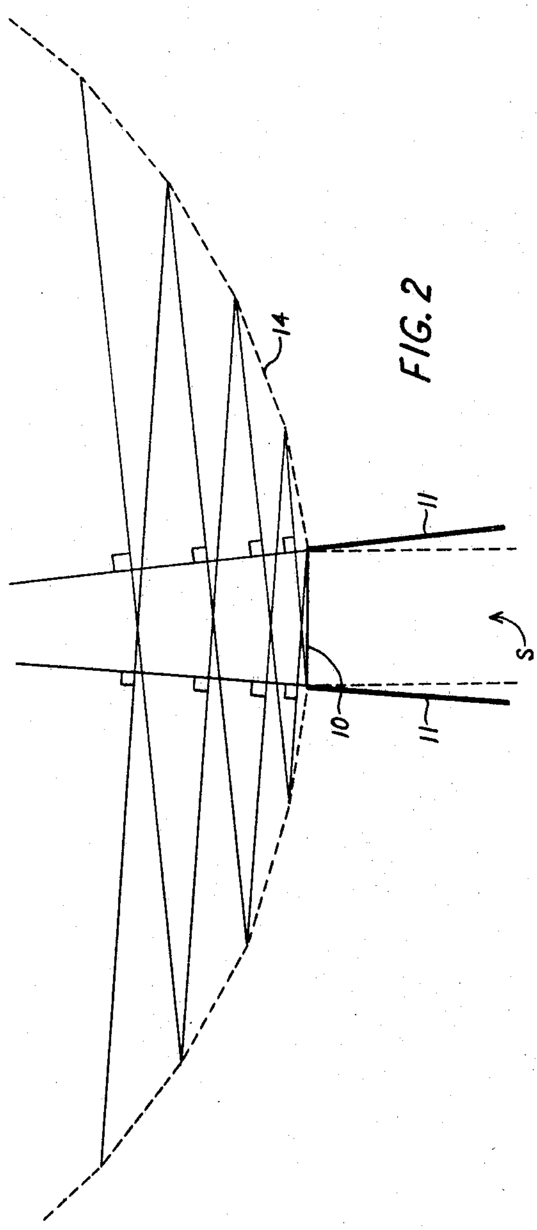

FIGURES 1 and 2 illustrate a viewing chamber having a square or rectangular screen 10, and mirror side walls on each side thereof angled so as to diverge outwardly from the screen 10 towards the viewer. Viewers V stand, (or sit) in space S. The floor 12 and ceiling 13 may be any non-reflective neutral surface in this case. A projector P projects an image precisely corresponding to screen 10. The resultant series of virtual images appears as a continuous pattern 14 curving away from the viewer.

Figure 3:
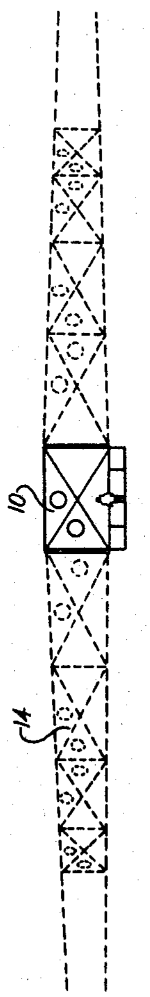

FIGURE 3 illustrates the pattern 14 of virtual images which reverse alternately as they are repeated.

In order to indicate this reversing of the images on the diagram, the image is represented schematically as an X, and two circles are shown in phantom in one quarter thereof. The axes of symmetry are shown between adjacent images as chain dotted lines.

It will be understood that the screen 10 and image projected thereon, must as nearly as possible coincide in shape and size. If the image is appreciably smaller than the screen then the virtual image pattern will be broken up by a network or grid of black lines.

On the other hand, if the image is appreciably larger than the screen and overlaps to any great degree onto any one of the adjacent mirror planes then the image will be reflected back onto the screen and appear as a faulty or "double" projection.

Unexpectedly it has been found that a very small overlap is beneficial, in the order of say one inch on each side in the case of a twenty-foot wide image or about 1% to 1.5%. The light intensity of an image projected by a conventional movie projector or slide projector, usually falls off markedly at the extreme edge producing a darkened margin. In normal projections this effect is unnoticed, but in the case of the present invention such a margin will appear as a dark grid on the virtual image.

The size and shape of the projected image are controlled by accurate focussing, and by the use of masks in the projector.

Figure 12:
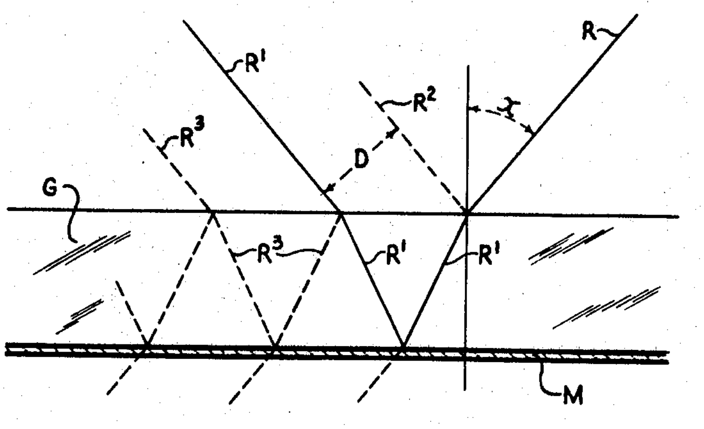
Figure 13:
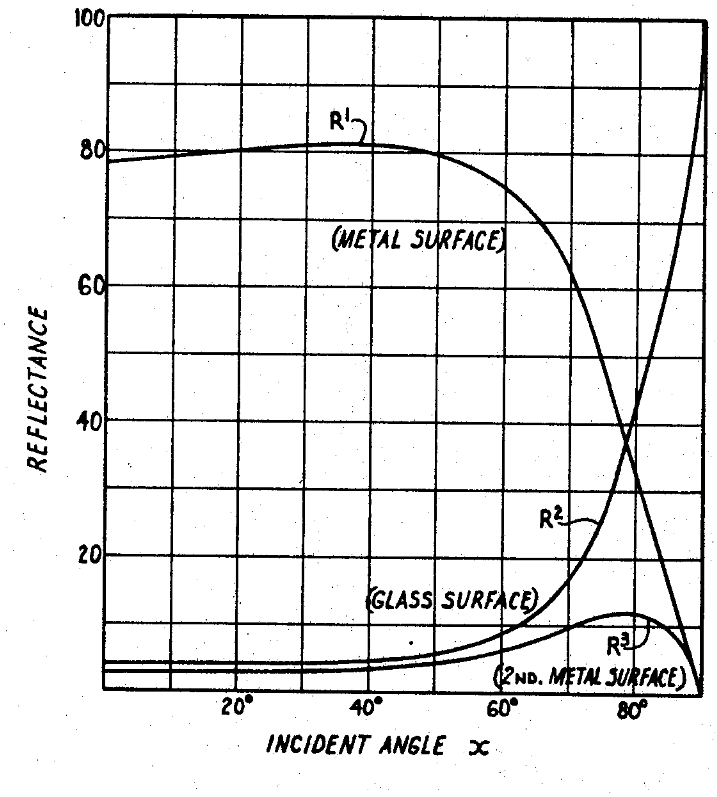

A further feature which is of significance is the avoidance of double and triple virtual images created by the reflectance at the air/glass and glass/air interface of the standard glass mirror. FIGURE 12 illustrates the problem in simple terms, which is well known and explained in standard school texts. Briefly the incident light ray R when it strikes the surface of glass G is both refracted into the glass G at $R^1$ and is also reflected off the glass at $R^2$. The ray $R^1$ is subsequently reflected at the metal surface M, refracted once more at the air/glass interface and emerges parallel to but spaced from the ray $R^2$. The viewer then sees two images corresponding to $R^1$ and $R^2$, displaced slightly one from another. The degree of reflectance at the air/glass surface is very low where the incident light is normal to the glass and increases as the incident light angle approaches ninety degrees. The degree of reflectance at the metal surface of a mirror is very high where the incident light is normal to the glass and decreases as the incident light angle approaches ninety degrees due to the fact that most of the light has been reflected at the air/glass interface as ray $R^2$ and therefore fails altogether to enter glass G (see FIGURE 13).

So long as the image reflected at the metal surface is several times stronger than that at the air/glass surface the double image will not normally be seen. However, if the reflectance values of both are plotted against incident light angle X the curves are found to intersect at about 78 degrees indicating a critical area of double image effect arising at least above 65 degrees and in some cases above 50 degrees. Similarly third, fourth etc. images are created by reflections within the glass itself as shown in FIGURE 12. However, the strength of such images is very much lower than the double image, and is at its maximum at about 78 to 80 degrees of incident light angle.

It is to be noted that the displacement between the true virtual image and the double, triple etc. images is the distance D which increases, and therefore becomes more obvious, as the critical angle of incidence is approached, and is, in any case where the double image is visible, in excess of one half the thickness of the glass G and may become almost equal to it.

Figure 11:
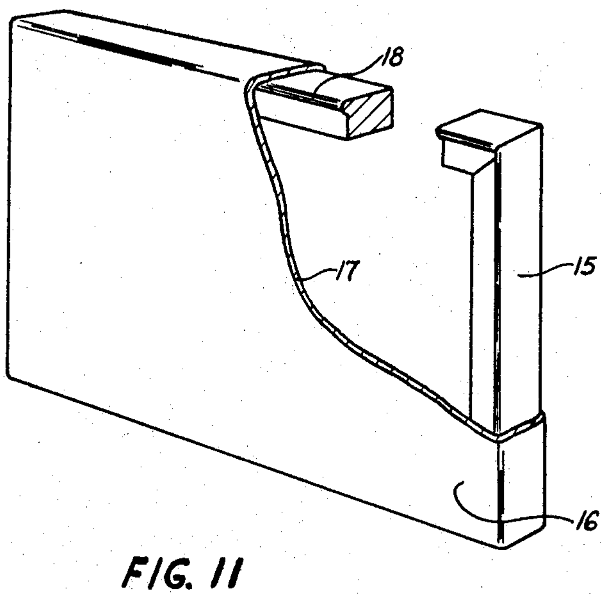

Accordingly, steps should preferably be taken to ensure that viewers V cannot get into a position in the chamber where their line of sight approaches or at any rate exceeds about 65 degrees and preferably 50 degrees relative to a line normal to any one of the glass mirror planes in the chamber. This can be achieved to some degree by simply reducing the area available for viewers, to a central zone in the chamber only. However, this becomes uneconomic and accordingly the present invention provides an alternative by replacing that portion of the glass mirror in each of side walls 11, which lies within this line of sight, such portions being indicated as **11*a*, with alternative mirrors in which the double image effect is indistinguishable. This can be achieved by simply silvering the air/glass surface thus overcoming the displacement of the virtual image due to refractions, which causes the double image. However, such an exposed surface soon deteriorates and is easily damaged in cleaning and is not practicable. Accordingly the side wall portions 11*a* are preferably formed as shown in FIGURE 11, by constructing a frame 15, and covering one side with a thin transparent polyester film 16 stretched tightly to lie absolutely flat, and having a mirror, metalised surface 17 on its inner side. The film 16** is preferably about two thousandths of an inch thick which means that any refraction effect even at extreme angles of incidence will be indistinguishable.

Frame 15 is preferably formed with a peripheral rib 18 extending forwardly therefrom to provide a narrow edge over which film 16 can be tensioned the same as, for example, a drum is tensioned.

The limit of resolution of the human eye is normally defined as a subtended angle of one minute of arc at a brightness level of one foot lambert. At say a six foot distance to the mirror surface, the limit of resolution, at that level of brightness, is 0.0209 inch. Thus even where double images do occur, if they are spaced apart a distance less than 0.0209 inch, at a range of twenty feet, they will not be discernible to the naked eye.

In the case of transparent polyester sheet, the optical properties, and refractive index, are very similar to that of glass and substantially the same critical angle of about 78 degrees is found to occur. Double images are thus formed in the same way as in glass. However, due to the fact that the plastic sheet is only 0.002 inch thick, the true virtual image and the double image are spaced apart by somewhat less than that, i.e. about 0.0015 to 0.0018 inch. As noted above this spacing is less than is discernible to the naked eye and hence the double image is invisible. Even where the virtual image, double image and triple image are formed, i.e. at 78 degrees, the total spacing between the double and triple image is only 0.003 inch which is still far below the powers of resolution of the eye, at the distances encountered in a typical viewing chamber, which may be 25 to 30 feet from projector to screen.

The problem of double images does not occur to the same extent on those portions of the side walls lying at the rear half of the chamber since the viewer will normally be looking at these wall portions at or close to perpendicular.

Figure 4:
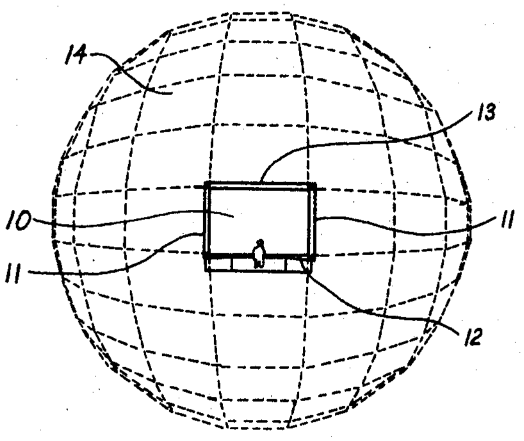

FIGURE 4 illustrates the vertical image pattern of a viewing chamber structure similar to that of FIGURE 1 showing the same image as in FIGURE 2 with axes of symmetry in phantom, but in this case floor 12 and ceiling 13 are mirror surfaces arranged in a similarly divergent manner so that the lines of intersection of the four mirrored planes meet at a single point such lines being equivalent to radii of a sphere which the viewer appears to see from its outside. It will be understood that where screen 10 is square the angles of divergence relative to the screen will all be the same. However, where the screen 10 is rectangular, the angles of divergence of wall 11 will differ from the angles of divergence of floor and ceiling 12 and 13. The pattern of apparent images in this case is shown as 14 and is in the form of a sphere made up of a number of planar images extending in a convex manner away from the viewer.

Figure 5:
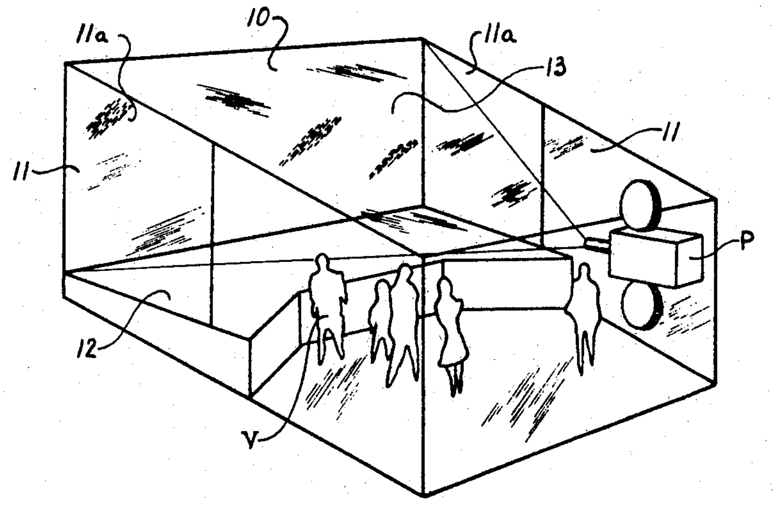
Figure 6:
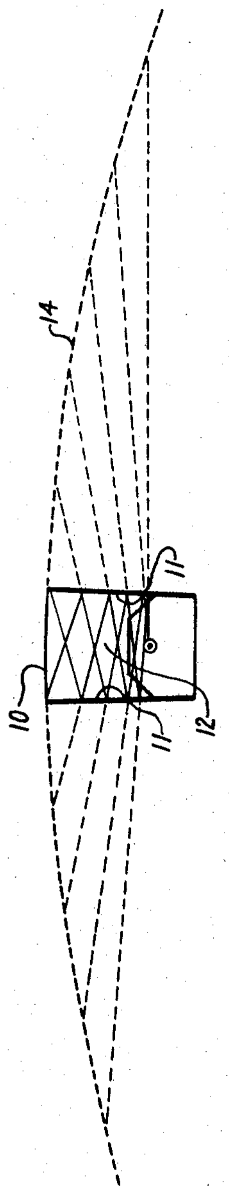

FIGURES 5 and 6 illustrate a further form in which the side walls 11 converge towards the viewers and the resultant apparent image pattern 14 is in the form of a curving line of images tending to surround the viewer.

Figure 7:
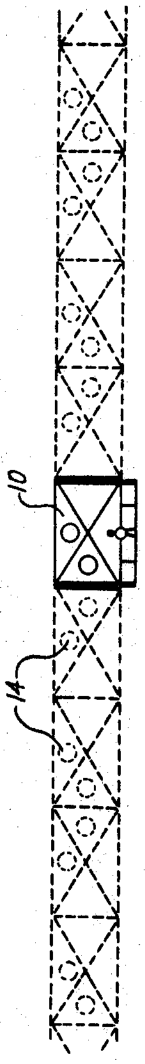

FIGURE 7 illustrates, schematically the virtual image pattern 14 showing the images repeating and alternately reversing.

Figure 8:
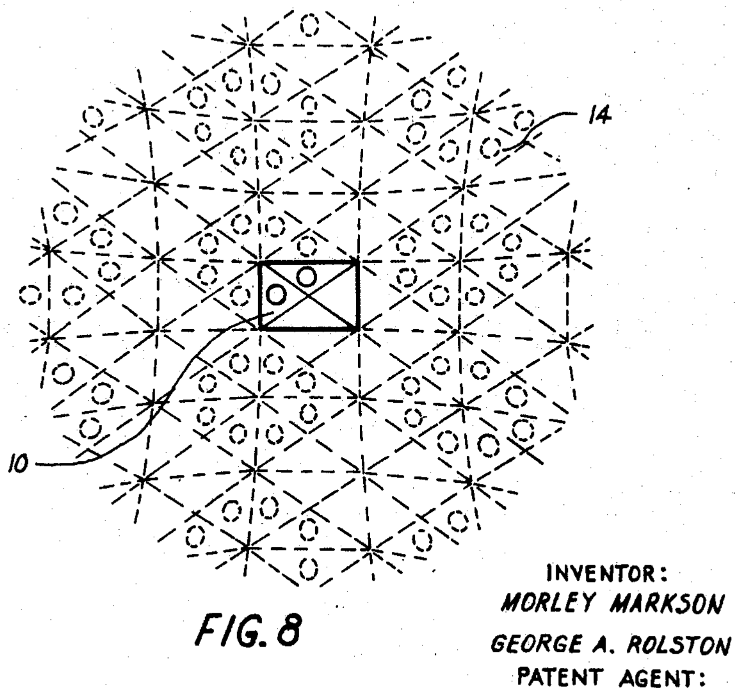

FIGURE 8 illustrates the equivalent addition as in FIGURE 4 applied to FIGURE 5 with the floor 12 and ceiling 13 formed with a mirror surface arranged in a similarly convergent manner so that the lines of intersection of the four mirrored planes meet at a single point such lines being equivalent to the radii of a sphere which the viewer sees from the inside. The pattern of apparent images in this case is shown as 14 and is in the form of a sphere extending in a concave manner tending to surround and enclose the viewer.

Figures 9, 10:
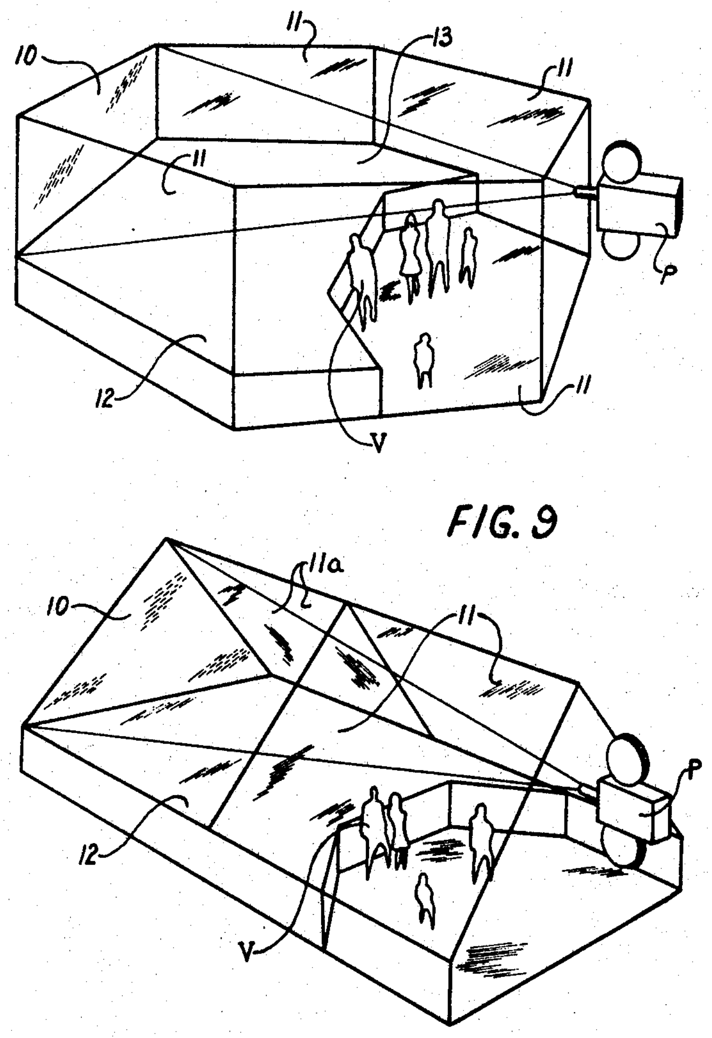

In the embodiment of FIGURE 9 four side walls 11 are arranged as four sides of a hexagon, the fifth side being constituted by screen 10 and the sixth side being open and occupied by projector P. The floor 12 and ceiling 13 are arranged horizontal and parallel. All four side walls 11 and floor 12 and ceiling 13 are provided with mirror surfaces.

The resultant pattern of apparent or virtual images is not illustrated but consists of an apparently infinite series of columns or pillars of prism-like appearance stretching vertically upwardly and downwardly.

In this embodiment the floor 12 and ceiling 13 can of course be arranged convergent or divergent, and the angles of inclination of the side walls 11 can be varied, to vary the virtual image as before.

In the embodiment of FIGURE 10 the chamber is triangular in section and the screen 10 is triangular in shape to correspond. Side walls 11 slope towards one another and are provided with mirror surfaces. Floor 12 is also provided with a mirror surface. The lines of junction between side walls 11, and between walls 11 and floor 12, are all parallel with one another. The end facing screen 10 is open and occupied by a projector.

The image projected on the screen 10 must of course be triangular in shape and correspond to the size of screen 10.

The resultant pattern of apparent or virtual images is not illustrated but consists of an infinitely extending series of triangles in an apparently vertical plane.

In this embodiment, as in the embodiment of FIGURE 9, mirrored planes can be arranged in a convergent or divergent manner, with the lines of intersection or junction of the planes lying along radii of a sphere.

It will be understood that while there has been described a vertical screen 10, it is possible that the screen be angled or arranged horizontal, the viewers looking downwardly from a gallery. The requirements that there be at least two mirrored planes adjoining opposite sides of the screen and that the image fill the screen will of course still apply.

Projection onto screen 10 can be either front or rear projection, but in the latter case the highly directional nature of a rear projection system must be overcome, for example by using a matte screen, so that the light is scattered and will be reflected by the adjacent mirrored planes.

The invention may be incorporated into a new theatre structure, or, due to its extreme simplicity, is suitable for installation in an existing theatre. Reflective surfaces can be mirror glass, metal or, preferably metallised plastic sheet such as metallised polyester sheet. In many cases the use of a glass mirror will cause construction and safety problems due to its great weight, and the reflections at the air/glass interface can result in double image effects. The use of metallised plastic sheet permits larger mirror planes to be formed over lightweight frames in complete safety and overcomes to a large degree the problem of double image formation. A combination of plastic ceiling and side walls, with a glass floor may be desirable in some cases where viewers may actually use the floor.

By the use of the invention various chambers can be constructed giving impressions of almost infinite image size or extent, at very low cost using only a single projector in a normal sized theatre. Thus the image may readily be seen repeated twenty or more times upwardly and a similar number downwardly. Given a screen and mirror planes of only six feet in height, the images will thus appear to extend at least one hundred and twenty feet up and at least one hundred and twenty feet down or a total of at least two hundred and forty feet in all.

Because the images appear so large, they can be viewed from any part of a chamber without losing sight of enough of the conglomerate image to lose effectiveness. Thus the viewers could stand on a flat floor and look upwards, over the heads of viewers in front of them, and still see a huge multitude of images. Of course, ramped seating or standing could be provided, but this is unnecessary because of the advantage cited above.

By a combination of a vertical screen in front of the viewers, and a horizontal screen above him, and two projectors, an environmental effect can be obtained with an overhead sky, and scenery on the horizon apparently extending entirely around the viewer, the extent of the virtual images being largely controllable by screen dimensions, and angles of mirror planes.

By way of comparison with large screen projection systems, a large screen of say 40′ by 80′ will require a light source of 15,000 watts capacity for an acceptable level of illumination. A screen of say 10′ by 20′, incorporated in the present invention and multiplied to extend over an area many times greater than 40′ by 80′, will require a light source of only 1,000 watts capacity for the same level of illumination.

Figure 14:
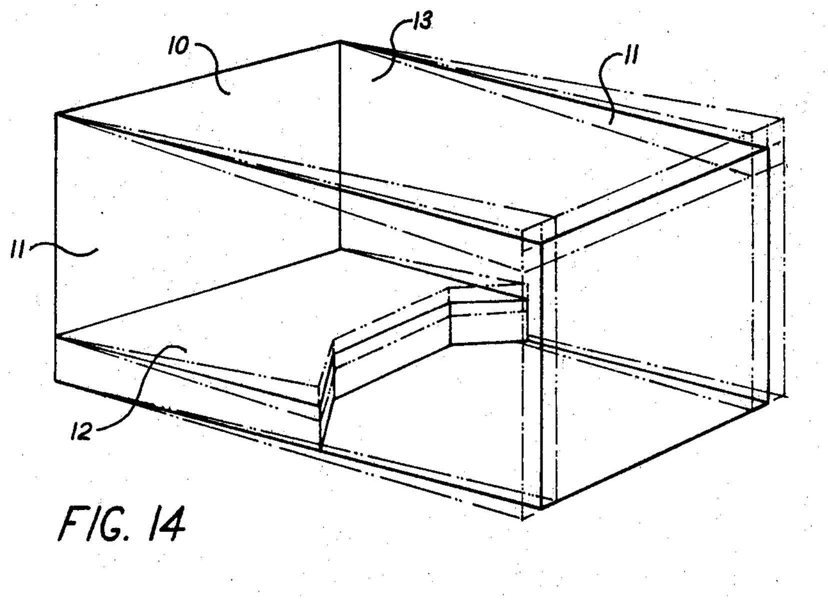
FIGURE 14 is a perspective schematic illustration of a further embodiment of viewing chamber in which one or more of the mirror surfaces are movable.
Figure 15:
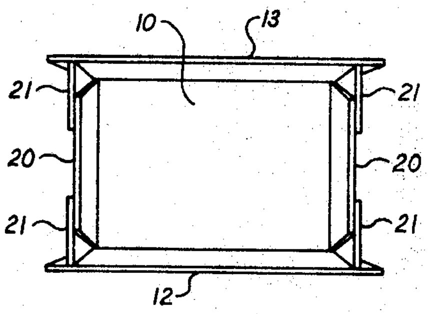

According to a further embodiment of the invention, still further effects may be obtained by providing means for moving one or more of the mirror surfaces while projection of the motion picture on the screen is actually taking place, thereby changing the pattern of virtual images. In general, it may be stated that any one or all of the mirror surfaces can be made to move. The movement, generally speaking, should be such that it increases or decreases the angle of the mirror surface to the screen. Thus for example FIGURE 14 illustrates such angular movement in respect of each one of the mirror surfaces, the phantom dotted lines being intended to indicate positions which may be adopted by any one or more of the mirror surfaces. Obviously, it is necessary that the construction of the mirrors and the chamber is such that upon movement of say the ceilings 13, upwardly, that some means are provided for preventing a wedge-shaped gap appearing at the upper edge of each of the walls 11. One way in which this can be achieved is shown in FIGURE 15. In this illustration, the side walls indicated generally as 11 comprise central portions 20 and upper and lower marginal portions 21 attached to the ceiling 13 and the floor 12, assuming that it is desired to move the floor 12. Marginal portions 21 are of course provided with mirror surfaces similar to that of portion 20. As ceiling 13 and floor 12 are moved away from one another, the wedge-shaped gap which will slowly develop along the edges of portions 20, will be concealed by the mirror surfaces of portions 21 which are gradually exposed. It is noteworthy that since the gaps are only at the upper and lower edges of the side walls 11, they will be almost entirely unnoticeable since, for the most part, the viewers will receive their reflections from the central portion of the screen and they will not be aware of the minor distortions occurring.

According to FIGURE 15*a* a further form of moveable mirror is shown in which the walls 11 and ceilings 13 and floor 12 are arranged with one edge overlapped by an adjacent edge of the next member as shown. In this manner it becomes possible to move all four members simultaneously without any gap whatever developing at the junctions thereof. Similarly it is possible to move the surfaces selectively by the provision of suitable hydraulic or mechanical controls.

According to a still further embodiment of the invention, provision may be made for covering and uncovering selected portions of the side walls or and/or floor and ceiling. One manner in which this may be achieved is shown in FIGURE 16. FIGURE 16 shows, by way of example only, a side wall 11 provided with a flexible, moveable roller blind 22 having upper and lower cables 23 fastened thereto which are attached to a forward-wind spindle 24 having cable-winding pulleys 25 thereon. A rewind spindle 26 is provided to accommodate the blind 22 when not in use. By the provision of suitable motors 27 and 28, the blind 22 may be drawn forward or rearwardly to cover or uncover the mirror surface of side wall 11. Obviously, similar arrangements can be made for other side walls or the floor or ceiling.

FIGURE 17 shows a further method by means of which substantially the same effect may be achieved. In this case, side wall 11 is made up of a plurality of mirror panels 29 each of which is provided with a mirror surface on one side and a black surface on the other side. By means of suitable linkage means (not shown) these panels 29 may be rotated either simultaneously or one after another to cover or uncover the mirror surface thereby varying the visual effect seen by viewers in the chamber. Again, this can be provided on either of the side walls or on the floor or ceiling, or altogether.

According to a still further embodiment of the invention, provision may be made for veiwing exteriorly of the chamber and for achieving different forms of virtual image patterns.

FIGURE 18 illustrates a viewing chamber having a screen 30 upon which an image is projected by a rear-projection projector P. Along one edge of screen 30, a mirror wall 31 formed according to the invention, is supported, and a further blank wall 32 is arranged opposite screen 30. A third wall 33 is arranged along the other edge of screen 30 which completes the viewing chamber. Wall 33 is a "half-silvered mirror" of the type which will reflect light striking it from one side, but which permits a person sitting on the opposite side to see through. In this case, assuming the mirrors 31, 33 and the screen 30 form a rectangular configuration, a viewer V looking through the wall 33 from the exterior will see a virtual image pattern I which appear to be a substantially straight line repetition of the image projected on the screen 30. In this way, it is possible to reduce the size of the viewing chamber for individual viewing.

If wall 32 is also mirrored then the straight line image pattern I will be reflected by a parallel pattern (not shown) spaced about twice the width of mirror 31.

A further embodiment of the invention suitable for individual viewing such as might take place in a fun fair or side show, or project a motion picture sequence in response to the deposit of a coin is shown in FIGURE 19. In this case, a screen 34 upon which an image is projected by the rear-projection projector P may be only a few inches across. Side walls 35 which may be a foot or two in length are arranged angularly with respect to screen 34, and the chamber is completed by a glass pane 36 preferably provided with a viewing hood 37 permits a person to look into the chamber from the outside. The virtual image pattern is shown as I although of course this can be changed by the addition of a floor and ceiling mirror wall and by the variation of the angles of the mirror walls relative to the screen 34 as described above in connection with the other embodiments of the invention. In this case, the whole apparatus may be housed within housing 38 provided with a coin slide 39 which, by suitable electrical circuits (not shown) may be arranged to control the operation of the projector P.

The foregoing description of various embodiments of the invention is here given by way of example only. It is not intended that the invention shall be limited to the specific features shown but comprehends all such variations as come within the spirit and scope of the appended claims.

What I claim is:

1. A viewing chamber for creating a large image illusion for viewing from a predetermined position and comprising:

a screen adapted for representation of an image of predetermined dimensions;

at least two side edges on said screen;

at least two mirror plane surfaces, one side edge of each of said mirror plane surface abutting on one side edge of said screen and said mirror plane surfaces extending towards a viewer from said screen; and means for creating an image directly on said screen shaped and dimensioned to correspond thereto whereby said image on said screen is repeated on said mirror plane surfaces and reversed for viewing simultaneously with said image on said screen.

2. The viewing chamber as claimed in claim 1, including at least one further mirror plane surface abutting on another edge of said screen and adjoining said two mirror surfaces aforesaid.

3. The viewing chamber as claimed in claim 1 wherein said image is dimensioned so as to overlap the edges of said screen to a small degree adjacent to said mirror surfaces at least.

4. The viewing chamber as claimed in claim 1 wherein some of said mirror surfaces comprise transparent material of a thickness less than the distance subtended by one minute of arc at the normal viewing distance from said screen.

5. The viewing chamber as claimed in claim 1 wherein said mirror planes are angled relative to said screen to converge towards a viewer.

6. The viewing chamber as claimed in claim 1 wherein said mirror planes are angled relative to said screen to diverge towards a viewer.

7. A viewing chamber as claimed in claim 1 wherein at least one of said mirrors is movably mounted for swinging movement so as to increase or decrease the angle of the same to the screen, and means for controllably moving the same.

8. The viewing chamber as claimed in claim 1, including means for selectively concealing and exposing at least one of said mirror surfaces.

9. The viewing chamber as claimed in claim 1, wherein said image creating means are arranged rearwardly of said screen with respect to a viewer thereof, and including means for individual selective operation of said projection means by said viewer.

References Cited

FOREIGN PATENTS 1,203,127 10/1965 Germany.

JOHN M. HORAN, Primary Examiner

R. A. WINTERCORN, Assistant Examiner

U.S. Cl. X.R.

350—117, 124; 352—70, 85; 353—10, 34